Aug. 2, 1955 J. R. HALL 2,714,634

MODULATED RADIO FREQUENCY SIGNAL AMPLIFIER

Filed April 16, 1954 2 Sheets-Sheet 1

INVENTOR.
James R. Hall
BY Charles H. Brown
ATTORNEY

MODULATED RADIO FREQUENCY SIGNAL AMPLIFIER

Filed April 16, 1954 2 Sheets-Sheet 2

INVENTOR.
James R. Hall
BY Charles H. Brown
ATTORNEY 2,714,634
Patented Aug. 2, 1955

2,714,634

MODULATED RADIO FREQUENCY SIGNAL AMPLIFIER

James R. Hall, Haddonfield, N. J., assignor to Radio Corporation of America, a corporation of Delaware Application April 16, 1954, Serial No. 423,675
9 Claims. (Cl. 179—171)

This invention relates to radio transmitters, and more particularly to amplifiers for efficiently amplifying radio frequency signals which may be amplitude, phase, or frequency modulated, and which may have suppressed carrier and/or suppressed side band.

Amplitude modulated radio broadcast transmitters commonly transmit a signal including a radio frequency carrier and two side bands. Such transmitters may be of the type employing high level modulation, or of the type employing an outphasing system of modulation. Transmitters of these two types are not suitable for transmitting some hybrid signals (single side band, vestigial side band and quadrature modulated), and are relatively complex and inefficient for transmitting frequency modulated and phase modulated signals.

A transmitter including a linear amplifier for modulated radio frequency signals operates at good efficiency for carrier suppressed double side band, frequency modulated, and phase modulated signals; but operates at poor efficiency for conventional amplitude modulated (carrier and double side band), and vestigial side band signals.

It is sometimes desirable for a transmitter to operate efficiently with two types of signals. For example, a transmitter may be normally employed to broadcast a conventional amplitude modulated signal, and when interference is encountered, be employed to utilize its entire output power for broadcasting a single side band signal. Under the latter condition, a source of carrier frequency must be supplied to the receivers by local beat oscillators in the receivers, or by a small carrier frequency transmitter in the area of the receivers.

It is an object of this invention to provide an improved universal transmitter operative at high efficiency for transmitting any kind of signal.

It is another object to provide an improved amplifier for modulated radio frequency signals of all kinds.

It is a further object to provide an amplifier for modulated radio frequency signals whereby any desired carrier amplitude may be provided in the output.

In one aspect, the invention comprises a source of a modulated radio frequency input signal which is applied to both a limiter and an amplitude detector. The output of the limiter provides the phase component of the input signal, and the output of a detector provides the amplitude compoent of the input signal. The phase component from the limiter is applied thru two parallel amplifying paths including class C amplifiers. The amplitude component from the detector, and the phase component of the input signal, are applied to modulating means. The outputs of the modulating means are applied to the two parallel paths to introduce modulation components which are in quadrature with the phase components so that the resultants in the two parallel paths are differentially phase modulated signals. A common output circuit for the two paths is arranged so that the phase components from the two paths cancel each other and the modulation components are combined to provide an output signal the same as the input signal, but in amplified form.

These and other objects and aspects of the invention will be apparent to those skilled in the art from the following more detailed description taken in conjunction with the appended drawings, wherein.

Figures 1, 2:
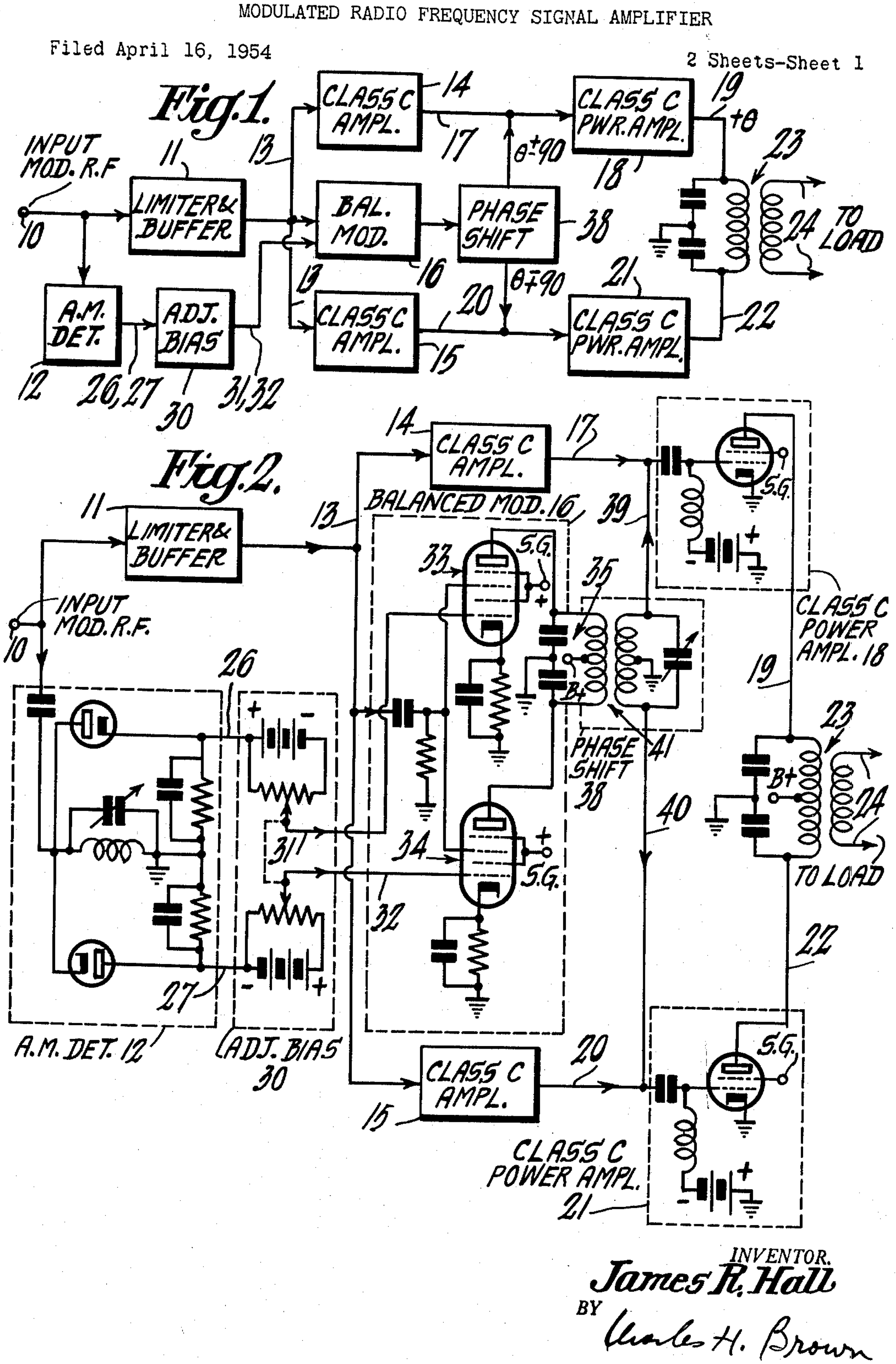
Figure 1 is a block diagram of a modulated radio frequency signal amplifier constructed according to the teachings of this invention.
Figure 2 is a circuit diagram showing the system of Figure 1 in greater detail.

Figures 1 and 2 show the same system, according to the invention, for amplifying a modulated radio frequency input signal. The input signal applied to input terminal 10 is fed to both a limiter and buffer 11, and to an amplitude detector or envelope detector 12. The limiter and buffer 11 removes the amplitude component of the input signal so that the output of the limiter 11 includes solely the phase component of the input signal. The output of the limiter 11 is applied over bus 13 to a class C vacuum tube amplifier circuit 14, a class C vacuum tube amplifier circuit 15, and a balanced modulator 16. The output of amplifier 14 is applied over lead 17 to a class C power amplifier vacuum tube circuit 18 having an output lead 19. The output of class C amplifier 15 is applied over lead 20 to a second class C power amplifier vacuum tube circuit 21 having an output lead 22. Amplifier 14 and power amplifier 18 constitute one parallel path for the output of limiter 11, and amplifier 15 and power amplifier 21 constitute a second parallel path. A push-pull output circuit 23 comprising a first coil in parallel with a capacitor network whose electrical center is grounded combines the outputs from the two parallel paths in such a way that the amplified phase component from the limiter 11 is cancelled and does not appear at the terminals of the second coil, in turn, connected to output leads 24.

The amplitude detector 12, which also reseives the modulated radio frequency input wave, is of conventional type including two oppositely connected diodes which provide a positive going envelope on ouput lead 26, and a negative going envelope on output lead 27. The outputs 26 and 27 from detector 12 are applied to an adjustable bias circuit 30 including batteries and ganged potentiometers so arranged that there is any desired direct current level on the output leads 31 and 32.

The output of adjustable bias circuit 30 is applied to the balanced modulator 16. The circuit of balanced modulator circuit 16 may be as shown in Figure 2, or may be according to any one of a number of known circuits. To obtain the advantages of the adjustable bias circuit, the modulator 16 should be responsive to direct current. The outputs on leads 31 and 32 from the adjustable bias circuit 30 are applied to the first control grids, respectively, of vacuum tubes 33 and 34 in balanced modulator 16. The phase component of the input signal from the limiter 11 is applied over bus 13 to the second control grids of the modulator tubes 33 and 34. The arrangement of the balanced modulator 16 is such that the radio frequency input signal from limiter 11 is balanced out in the output circuit 35 of the balance modulator.

The output of balanced modulator 16 is coupled to a phase shift circuit 38 having two outputs on leads 39 and 40. The output circuit 35 of the balanced modulator 16 includes a primary winding of a coupling transformer 41 so arranged that the signal at the ends of the primary winding are 180 degrees out of phase. The signal in the secondary winding of coupling transformer 41 is also 180 degrees out of phase at the two ends of the secondary winding. The energy in the secondary winding is 90 degrees out of phase compared with the energy in the primary coil of the transformer 41. The outputs of the phase shift circuit on leads 39 and 40 are therefore 90 degrees out of phase and are shifted 90 degrees compared with the phase of the energy on bus 13. The outputs of the phase shifter 38 on leads 39 and 40 are applied to the leads 17 and 20, respectively, in the parallel amplifying paths.

In the operation of the system of Figures 1 and 2, the modulated radio frequency input signal from input terminal 10 is divided into its phase component which is available at the output of limiter 11, and into its amplitude component which is available at the output of detector 12. The phase component is applied to two parallel amplifying paths, the first path including amplifiers 14 and 18, and the second path including amplifiers 15 and 21. The outputs on leads 19 and 22 of the two parallel paths are combined in an output circuit 23. The output circuit 23 is a push-pull arrangement wherein the in-phase component from the two paths is cancelled so that it does not appear at the output leads 24.

The amplitude component of the input signal derived from the detector 12 is applied through an adjustable bias circuit 30 to the balanced modulator 16. The phase component from the limiter 11 is also applied to the balance modulator 16. Due to the mixer action in the balance modulator 16, the output of the modulator provides two modulation component signals 180 degrees out of phase with each other at the two terminals of the primary coil of coupling transformer 41. The modulation component signal induced in the secondary coil of coupling transformer 40 is shifted 90 degrees in phase with respect to the modulation component in the primary coil. The two modulation component signals on the output lead 39 and 40 of the phase shift circuit 38 are thus at 180 degrees with respect to each other and are at 90 degrees with respect to the original phase component signal in the two parallel paths. The modulation component on lead 39 is combined with the phase component on lead 17 to provide a resultant which varies in phase but remains substantially constant in amplitude. The modulation component on lead 40 is combined with the original phase component on lead 20 to provide a resultant which also varies in phase but remains substantially constant in amplitude. Since the modulation components applied to the two parallel paths are 180 degrees out of phase, the resultants in the two parallel paths are differentially phase modulated signals. That is, when the phase of the resultant in one parallel path shifts in one direction, the phase of the resultant in the other parallel path shifts in the opposite direction by an equal amount.

The differentially phase modulated signals in the two parallel paths are amplified by class C power amplifiers 18 and 21, respectively. The outputs of the amplifiers 18 and 21 are combined in the output circuit 23 wherein the original phase components cancel each other, because they are in phase and are applied to opposite ends of the primary coil. The modulation components, however, in the output circuit 23 are 180 degrees out of phase so that they add together and provide an output on output leads 24. Leads 24 may be connected over a transmission line to an antenna which provides the load for the system. The modulation component on the output leads 24 is an amplified version of the input signal applied to input terminal 10. The output wave has exactly the same phase and amplitude components as were present in the input wave.

The output signal may be modified compared with the input signal by means of the adjustable bias circuit 30. If the input signal is one including a carrier frequency component, the adjustable bias circuit 30 may be adjusted so that the output signal on leads 24 is one having a different desired amplitude of carrier frequency component, or no carrier frequency component at all.

Figure 3:
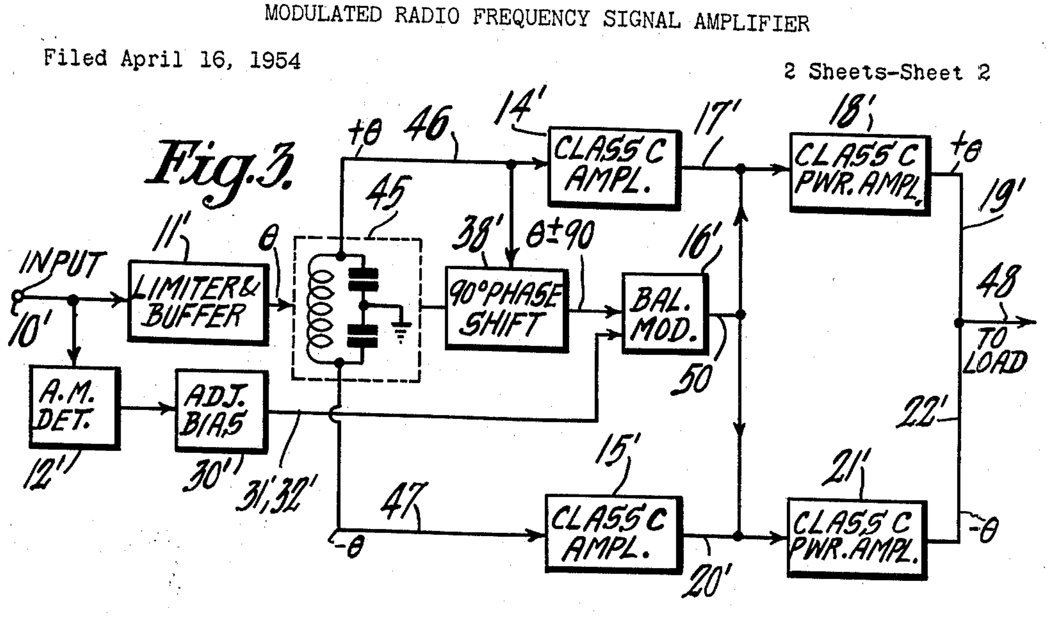
Figure 3 is a block diagram of a modified form of the invention.

Figure 3 shows another form of the invention wherein circuits corresponding to those in Figures 1 and 2 bear the same reference numerals with prime designation added. The output of limiter 11' is coupled to a phase shift circuit 45 having output leads 46 and 47 carrying phase components of the original input signal, the phase components being 180 degrees out of phase with each other. Lead 46 is connected to class C amplifier 14' and thence to amplifier 18' which together constitute the first of the two parallel paths. Lead 47 is connected to class C amplifier 15', which is in turn coupled to amplifier 21', the amplifier 15' and 21' constituting the second of the two parallel amplifying paths. The outputs of amplifiers 18' and 21' on leads 19' and 22', respectively, are connected together so that the out-of-phase phase components cancel each other, and do not appear on the output lead 48.

The phase component in the lead 46 of the first parallel path is connected to the 90-degree phase shift circuit 38' from which an output is applied to the balanced modulator 16'.

The amplitude component of the original input signal is derived from the detector 12', applied through the adjustable biasing circuit 30', and leads 31', 32' to the balanced modulator 16', after the manner shown in Figure 2. The output lead 50 of balanced modulator 16' carries a modulation component which is disposed at 90 degrees in phase compared with the phase components in lead 17' and 20' of the two parallel paths. The modulation component is combined with the phase component on lead 17' to produce a resultant, the phase of which varies in accordance with the amplitude of the modulation component. The modulation component combines with the phase component on lead 20' of the other parallel path to produce a resultant which varies in phase in an opposite direction to the variation in lead 17'. The signals on lead 17' and 20' are therefore differentially phase modulated signals.

The signals in the two parallel paths further amplified by amplifiers 18' and 21', respectively, and the outputs of the amplifiers are combined on an output lead 48. Since the phase components in the two parallel paths are 180 degrees out of phase, they cancel at the output lead 48. The modulation components, however, are in phase in the two paths so that they add together at the output lead 48. The signal at the output lead 48 is therefore an amplified version of the input signal applied to input terminal 10'. It will be seen that the circuit of Figure 3 differs from that of Figures 1 and 2 in the arrangement whereby differentially phase modulated signals are generated in the parallel paths.

Figure 4:
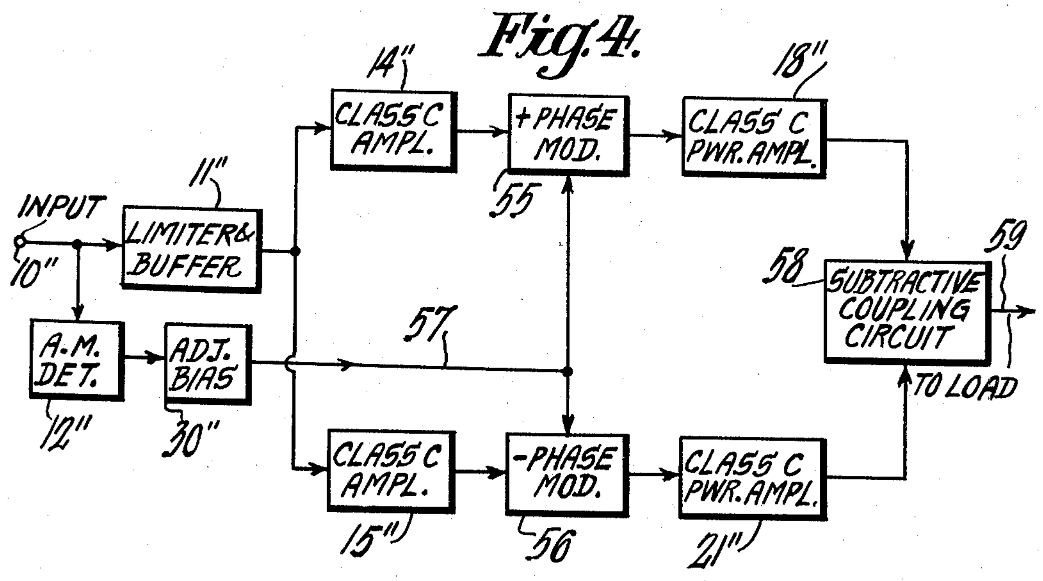
Figure 4 is a block diagram if a further modified form of the invention.

Figure 4 shows a further modified form of the invention wherein circuits corresponding with those of the other figures are given the same numerals with double prime designations added. As previously described, the input signal is divided into its phase component and its amplitude component. The phase component is applied in phase thru two parallel amplifying paths, one of which includes class C amplifier 14'' and class C amplifier 18'', the other of which includes class C amplifiers 15'' and 21''. A path positive going phase modulator 55 is inserted in the first of the parallel paths, and a negative going phase modulator 56 is inserted in the second of the parallel paths. Modulating signals comprising the amplitude component of the input signal are applied over lead 57 to the phase modulators 55 and 56. The outputs of the two parallel paths are combined in a subtractive coupling circuit 58 having an output lead 59. The subtractive circuit 58 may be the same as circuit 23 of Figure 2, or may be any suitable circuit wherein signals from the two paths having opposite phases are added, and those having the same phase are subtracted or cancelled.

The operation of the system of Figure 4 is such that the original phase component goes thru the two parallel paths in phase and is cancelled in the subtractive coupling circuit 58. Modulation components of opposite phase are introduced into the two parallel paths by phase modulators 55 and 56. The modulation components, being out of phase, add up in the subtractive coupling circuit 58 to provide the desired output on lead 59.

The basic operation of all three forms of the invention is the same. When the input signal is an amplitude modulated double side band signal with carrier, the system works as an outphasing modulation system. The phase component derived by the limiter 11 does not fluctuate in accordance with the intelligence. Instead of applying a modulated radio frequency signal to the input terminal 10, the radio frequency carrier may be applied to the limiter 11 and the intelligence signal may be separately applied to the modulator 16 .

When the input signal is a phase modulated or frequency modulated signal, the system acts as two parallel class C amplifiers. There is no fluctuating amplitude component in accordance with the intelligence, and a steady D. C. bias value is applied from the detector 12 and bias circuit 30 to the balanced modulator 16.

When the input signal is a hybrid signal, that is, having carrier suppressed double or single side band, vestigial side band, or quadrature modulated waves, the system acts as an envelope elimination and restoration system. Hybrid signals include a phase component and an amplitude component. The phase component is amplified in the two parallel class C amplifying channels, and the amplitude component is handled by differentially phase modulating the two parallel channels.

What is claimed is:

1. Means to amplify a modulated radio frequency input signal, comprising, means to separate the signal into its phase component and its amplitude component, two parallel amplifying paths, means to apply said phase component thru said parallel amplifying paths, modulator means coupled to reecive said phase component and said amplitude component and having outputs applied to said parallel paths to introduce modulation components in quadrature with said phase components so that the resultants in said parallel paths appear as differentially phase modulated signals, a common output circuit for said paths arranged so that the phase components from said two paths cancel each other therein, whereby said modulation components are combined in said output circuit to reproduce said input signals in amplified form.

2. Amplifying means as defined in claim 1, and in addition, direct current bias means effectively interposed in the path of said amplitude component, whereby to determine the amplitude of the carrier frequency component in the output circuit.

3. Means to amplify a modulated radio frequency input signal comprising, a limiter and an amplitude detector both receptive to said input signal, two parallel amplifying paths, means coupling the output of said limiter to the inputs of said two parallel paths, a balanced modulator receptive to the output of said limiter and the output of said detector, means to apply the output of said balanced modulator to said parallel amplifying paths to create differentially phase modulated signals therein, and a common output circuit for said path.

4. Amplifying means comprising, a limiter and a detector, means to apply a modulated radio frequency signal to said limiter and said detector, a balanced modulator, two parallel class C amplifying paths, means to apply the output of said limiter to said balanced modulator and to said amplifying paths, means to apply the output of said detector to said balanced modulator, a phase shift circuit having an input coupled to the output of said balanced modulator and having two out-of-phase outputs which are 90 degrees out of phase with the input, means to apply the outputs of said phase shift circuit to the respective parallel amplifying paths, and a common push-pull output circuit for said parallel paths wherein frequency components from the two paths which are in phase are cancelled.

5. An amplifier as defined in claim 4, and in addition, an adjustable direct current bias circuit interposed between said detector and said balanced modulator.

6. An amplifier comprising, a limiter, a detector, means to apply a modulated radio frequency signal to said limiter and to said detector, an output circuit for said limiter providing two out-of-phase outputs, two parallel class C amplifying paths having inputs coupled to respective ones of said out-of-phase outputs, a balanced modulator, a 90-degree phase shift circuit having an input coupled to one of said out-of-phase outputs and having an output connected to said balanced modulator, means coupling the output of said detector to said balanced modulator, means coupling the output of said balanced modulator to both of said parallel amplifying paths, and a common output lead for both of said parallel amplifying paths.

7. An amplifier as defined in claim 6, and in addition, an adjustable direct current bias circuit interposed between said detector and said balanced modulator.

8. An amplifier system comprising, a limiter, a detector, means to apply a modulated frequency signal to said limiter and to said detector, two parallel class C amplifying paths each including in the order named, a class C amplifier, a phase modulator and a class C power amplifier, one of said phase modulators being positive going and the other being negative going, means to couple the output of said limiter to the inputs of said two parallel amplifying paths, means to couple the output of said detector to both of said phase modulators, and a subtractive coupling circuit for combining the outputs of said two class C power amplifiers.

9. An amplifier as defined in claim 8, and in addition, an adjustable direct current bias circuit effectively interposed between said detector and said phase modulators.

References Cited in the file of this patent

UNITED STATES PATENTS 2,666,133 Kahn ---------------- Jan. 12, 1954